United States Patent Office 3,469,153
Patented Sept. 23, 1969

3,469,153
APPARATUS FOR ENERGIZING AND DE-ENERGIZING A PLURALITY OF SWITCHING DEVICES IN A PREDETERMINED SEQUENCE
Hendrik C. Appelo, Monroeville, Pa., assignor to Westinghouse Electric Corporation, Pittsburgh, Pa., a corporation of Pennsylvania
Filed Apr. 28, 1967, Ser. No. 634,769
Int. Cl. H01h 47/14
U.S. Cl. 317—140        7 Claims

ABSTRACT OF THE DISCLOSURE

An add or remove control circuit having an add relay and a remove relay for operating a plurality of contactors (electromagnetic coils with a plurality of normally open contacts) in sequence wherein each contactor has an add-seal circuit which includes its electromagnetic coil, source potential, a normally closed contact of the remove relay and one of its own normally open contacts and wherein each contactor, except the last, has an anti-drop circuit which includes its electromagnetic coil, source potential, a silicon controlled rectifier switching device, a normally open contact from the next higher numbered contactor and a normally open contact from all the lower numbered contactors, except the first.

Background of the invention

In the traction industry, the control required by electric railway applications often requires sequenced operation of a plurality of electrical contactors or switches. For example, speed control of direct current motors may be obtained by a control system which provides a plurality of addable voltage steps, or sources, with the output voltage of one of the sources being continuously variable from substantially zero to its full value. Sequentially operated switching devices are required to switch a voltage source into the circuit each time the variable voltage source reaches maximum voltage, while increasing the voltage applied to the motors, and to switch a voltage source out of the circuit each time the variable voltage source is reduced to its minimum voltage, while reducing the voltage applied to the motors. The switching of a new block of voltage into or out of the controlled system requires simultaneous adjustment of the variable voltage source, to make the transition with a negligible change in the voltage applied to the motors. After reaching maximum voltage, i.e., when all of the voltage sources are connected to the motors, further speed control may be accomplished by switching portions of the motor field windings out of, and into the circuit, which requires still further sequentially operated switching devices. An electric railway power system which requires sequentially operated electrical switching devices is disclosed in copending application Ser. No. 604,969, filed Dec. 27, 1966, now U.S. Patent 3,419,786 which is assigned to the same assignee as the present application.

Control for electrical transit systems must be extremely reliable, it must occupy very little space, and it must have a minimum cost. Therefore, the control for sequencing the operation of a plurality of electrical switching devices should contain as few components as possible, in order to increase its reliability and reduce its size and cost, and the components must be rugged, easily obtainable, standard items which will provide essentially trouble-free operation, and facilitate periodic preventive maintenance.

Summary of the invention

Briefly, the invention is a sequence control circuit which will close a plurality of electrical switching devices numbered 1 . . . N in the numbered sequence, and open them in reverse sequence, while requiring only two auxiliary relays. The first auxiliary relay, which may be called the "add" relay, is energized for a predetermined short interval of time when a switching device is to be closed, and the second relay, which may be called the "remove" relay, is energized for a predetermined short interval of time when a switching device is to be opened.

Each contactor has a direct current operated electromagnetic coil and a plurality of normally open contacts. The electromagnetic coil of the first contactor is connected to a source of direct current potential through a normally open contact of the add relay, which circuit will be called the "add circuit." The add circuit of each of the remaining contactors includes the source potential, the normally open contact of the add relay, a normally open contact from each of the lower numbered contactors, and a static switching device, such as a silicon controlled rectifier.

Each contactor has an add-seal circuit which includes its electromagnetic coil, the source potential, a normally closed contact of the remove relay, and one of its own normally open contacts.

Each contactor, except the last contactor of the numbered sequence, also has an anti-drop circuit which includes its electromagnetic coil, the source potential, a static switching device, such as a silicon controlled rectifier, a normally open contact from the next higher numbered contactor, and a normally open contact from all of the lower numbered contactors, except the first contactor of the sequence.

When the add relay is energized for the predetermined short period of time, in response to a requirement for adding a contactor, the first open contactor in the numbered sequence will be energized, which closes its normally open contacts, seals itself in through its add-seal circuit, and "arms" the add circuit of the next higher numbered contactor. When the remove relay is energized for the short period of time, in response to a requirement for removing a contactor, the last closed contactor of the numbered sequence will open, which opens its normally open contacts, breaks its add-seal circuit, and de-arms the anti-drop circuit of the next lower numbered contactor.

Brief description of the drawing

Further advantages and uses of the invention will become more apparent when considered in view of the following detailed description and drawings, in which.

Description of preferred embodiment

Figure 1:
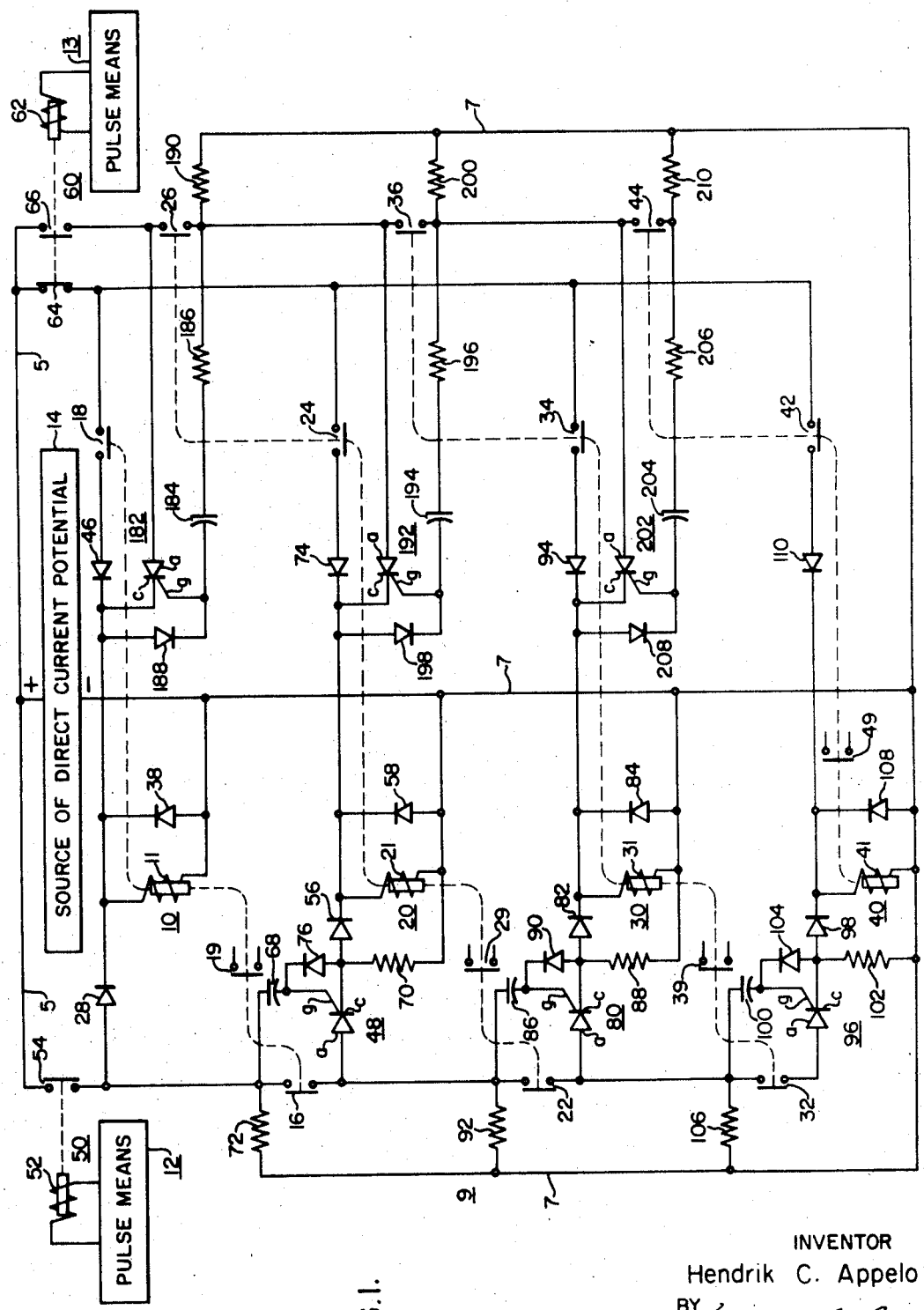
FIGURE 1 is a schematic diagram which illustrates the teachings of the invention.

Referring now to the drawings, and FIG. 1 in particular, there is shown a schematic diagram of an electrical control circuit 9 which embodies the teachings of the invention, in which a plurality of electrical contactors or switching devices are to be opened and closed in predetermined sequences. For purposes of this example, four electrical contactors 10, 20, 20 and 40 are shown. However, the invention applies to any plurality. Assuming the plurality of contactors to be numbered 1 . . . N, the contactors are to be closed in their numbered sequence, and opened in reverse sequence, such that when it is desirable to close a contactor, the first open contactor in the numbered sequence will automatically be closed by control circuit 9, and when it is desirable to open a contactor, the last closed contactor in the numbered sequence will be opened. Thus, the numbered sequence of contactors 10, 20, 30 and 40 would be 1, 2, 3 and N, respectively, and they will be closed in this sequence, and opened in reverse sequence.

According to the teachings of this invention, the required sequencing of any plurality of contactors is accomplished by using only two auxiliary relays 50 and 60. Relay 50, which may be called the "add" relay, as it controls the adding or closing of contactors, includes an electromagnetic coil 52 and a normally open contact 54. The function to be provided by relay 50 is to close its normally open contact 54 for a predetermined short period of time, each time a new contactor is to be closed in the sequence. Therefore, solid state switching devices which will perform the same function may be used instead of electromagnetic relay 50, if desired.

Relay 60, which may be called the "remove" relay, as it controls the removing or opening of contactors, includes an electromagnetic coil 62, a normally closed contact 64, and a normally open contact 66. The function of relay 60 is to close its normally open contact 66 and open its normally closed contact 64 for a predetermined short period of time each time a contactor is to be opened. Therefore, solid state switching devices may be used to provide these functions, if desired.

The means for energizing relays 50 and 60 when a contactor is to be closed, and when a contactor is to be opened, respectively, are illustrated in block form and labeled pulse means 12 and 13, respectively. Any conventional means for providing a voltage pulse of predetermined short duration may be used. For example, if the contactors are to be utilized in a transit system in which a voltage is increased in steps by contactors, and the first step has phase controlled switching means to provide a continuously adjustable voltage, the firing control for the phase controlled switching means may provide a signal when the firing angle is zero degrees. This signal may be applied to a bistable and then a monostable multivibrator circuit, to provide a voltage pulse of predetermined duration, which pulse would then be applied to relay 50. Relay 50 closes its contact 54, and closes the first open contactor in the sequence, which would add a new voltage step, and another contact on the contactor may be used to reset the firing means.

The firing means may also be arranged to provide a signal upon reaching a firing angle of 180°, which signal may also be applied to a bistable and to a monostable multivibrator to provide a voltage pulse of predetermined duration, which would be applied to relay 60. Relay 60 opens contact 64, closes contact 66, and opens the last closed contactor in the numbered sequence, which contactor removes a voltage step, and may also have another contact to reset the firing means.

The duration of the voltage pulse applied to relay 50 is not critical. It is only important that it be long enough to pick up the selected contactor and allow it to seal in, as will be hereinafter explained. The duration of the voltage pulse applied to relay 60 is also not critical. It is only important that it be long enough to allow the selected contactor to drop out. A voltage pulse having a duration of two seconds has been found to be suitable.

Each of the electrical contactors 10, 20, 30 and 40 has an electromagnetic coil 11, 21, 31 and 41, respectively, which are energizable through relay means 50 and 60 by a source 14 of direct current potential. Source 14, which is connected to a positive and negative bus 5 and 7, respectively, may be an electrical storage device, a rectified alternating potential, or any other suitable source of direct current potential.

The first electrical contactor in the numbered sequence, contactor 10, has at least two normally open contacts 16 and 18, in addition to a main contact 19. Main contact 19 is connected in the system to be controlled, such as an electrical power system for an electrically operated transit vehicle, and, as will hereinafter be explained, contact 16 is used to ready or arm the next contactor in the numbered sequence, and contact 18 is used to seal in contactor 10. The next contactor in the numbered sequence, contactor 20, has at least three normally open contacts 22, 24 and 26, in addition to main contact 29. Main contact 29 is connected in the controlled system, contact 22 is used to ready or arm the next contactor in the numbered sequence, contact 24 is used to seal in contactor 20, and contact 26 is used to arm the anti-drop circuit of the next lower numbered contactor in the sequence, contactor 10.

The next contactor in the numbered sequence, contactor 30, has at least three normally open contacts 32, 34 and 36, in addition to main contact 39. Main contact 39 is connected in the controlled system, contact 32 is used to arm the next contactor in the numbered sequence, contact 34 is used to seal in contactor 30, and contact 36 is used to arm the anti-drop circuit of the next lower numbered contactor in the sequence, contactor 20.

The next contactor in the numbered sequence, contactor 40, which in this example is the Nth contactor, has at least two normally open contacts 42 and 44, in addition to main contact 49. Main contact 49 is connected in the controlled system, contact 42 is used to seal in contactor 40, and contact 44 is used to arm the anti-drop circuit of the next lower numbered contactor in the sequence, contactor 30. Thus, the first and the Nth contactors of the numbered sequence require at least two normally open contacts, in addition to their main contacts, and the intermediate contactors require at least three normally open contacts, in addition to their main contacts. The first and last contactors of the sequence require one less contact than the other contactors, as the first contactor does not have to arm an anti-drop circuit of a lower numbered contactor, and the last contactor does not have to arm the add circuit of higher numbered contactor.

It is to be understood that the contactors may have additional normally open and/or normally closed contacts to provide any other control functions, as required by the controlled system.

Each of the contactors in the numbered sequence has a circuit which will be called an "add circuit," as it is activated when its associated contactor is to be added or closed. The add circuit of contactor 10 includes source potential 14, normally open contact 54 of relay 50, asymmetrically conductive device 28, such as a silicon diode, and the electromagnetic coil 11 of contactor 10. A diode 38 is also connected across the electromagnetic coil 11. When relay 50 is energized for the short predetermined time interval, its contact 54 closes, completing a circuit from the source potential 14 through electromagnetic coil 11. Contactor 10 thus picks up, closing its contacts 16, 18 and 19. When contact 18 closes, a circuit which will be called the "add-seal" circuit is also completed through electromagnetic coil 11, which circuit includes the source potential 14, the normally closed contact 64 of relay 60, normally open contact 18 of contactor 10, and a diode 46. Therefore, when relay 50 is de-energized at the end of the short time interval, the circuit through electromagnetic coil 11 is maintained through its add-seal circuit.

The add circuits of the remaining contactors differ from the add circuit of the first contactor of the numbered sequence, as when the first contactor is to be closed there is no problem of assuring that earlier contactors in the sequence have been closed. More specifically, the add circuit of contact 20, which is the next contactor of the numbered sequence, includes the source potential 14, normally open contact 54 of relay 50, normally open contact 16 from the immediately preceding contactor 10, controlled rectifier 48, such as a silicon controlled rectifier having anode, cathode, and gate electrodes $a$, $c$ and $g$, respectively, diode 56, and electromagnetic coil 21 of contactor 20. A diode 58 is connected across electromagnetic coil 21. The gate-cathode circuit of controlled rectifier 48 is connected across the source potential 14 via a capacitor 68 and a resistor 70, and it may be protected from excessive reverse voltage by diode 76 connected across the gate-cathode circuit. Capacitor 68 is connected from the gate electrode $g$ to the relay 50 side of normally open contact 16, and the resistor 70 is connected from the cathode electrode c to the negative bus 7. The values of capacitor 68 and resistor 70 are chosen to provide a time constant which is substantially less than the pickup time of the contactor. For example, the time constant of this R-C circuit may be .2 millisecond, while the pickup time of the contactors will be in the order of several milliseconds. When contact 54 of relay 50 closes to energize contactor 10, gate current will also be supplied to controlled rectifier 48. However, since the gate current will terminate before contactor 10 picks up, contact 16 of contactor 10 will be open and controlled rectifier will not conduct due to lack of anode voltage. When contact 54 of relay 50 opens, capacitor 68 will discharge through resistor 72, which is connected from the relay 50 side of contact 16 to negative bus 7. Diode 28 in the add circuit of contactor 10 blocks the source voltage from being applied to capacitor 68 through the add-seal circuit of contactor 10.

After contactor 10 has been energized and sealed in through its add-seal circuit, the add circuit of contactor 20 is made ready or armed by the now closed contact 16 of contactor 10. When relay 50 again closes its contact 54 to signal that the first open contactor in the sequence should close, controlled rectifier 48 will have both anode voltage and gate current, causing it to switch to its conductive state. Resistor 70, which parallels electromagnetic coil 21 of contactor 20, allows the current flow through controlled rectifier 48 to immediately rise above its holding value, and thus assure that controlled rectifier 48 will stay energized while the current through electromagnetic coil 21 is rising more slowly due to its inductance. When contactor 20 picks up, it closes its contact 22 to arm the add circuit of the next higher numbered contactor in the sequence, it closes its contact 24 to seal itself in through contact 64 of relay 60 and diode 74, and it closes contact 26 connected in an anti-drop circuit associated with the immediately lower numbered contactor 10, which will be hereinafter described. Diode 56 prevents current from flowing continuously through resistor 70.

The add and the add-seal circuits of the remaining contactors in the sequence are all similar to those of contactor 20, with the add circuit of each succeeding contactor including a normally open contact from each of the preceding contactors in the sequence. The add circuit of contactor 30 includes source potential 14, contact 54 of relay 50, contact 16 of contactor 10, contact 22 of contactor 20, the anode-cathode circuit of controlled rectifier 80, and the electromagnetic coil 31 of contactor 30. The anode electrode a of controlled rectifier 80 is connected to the source potential through contact 22, its gate electrode g is connected to the relay 50 side of contact 22 through capacitor 86, and its cathode electrode c is connected to bus 7 throuh resistor 88. Thus, when contactor 10 is closed and contactor 20 is open, controlled rectifier 80 receives gate current when relay 50 closes its contact 54, but the gate current terminates before contactor 20 picks up. As described relative to contactor 20, the duration of the gate current applied to controlled rectifier 80 is determined by the value of capacitor 86 and the value of resistor 88. When relay contact 54 opens, the capacitor 86 discharges through resistor 92 to bus 7, and diode 28 in the add circuit of contactor 10 prevents capacitor 86 from charging through the add-seal circuit of contactor 10. A diode 90 may be connected across the gate-cathode circuit of controlled rectifier 80 to protect it from excessive reverse voltages. A diode 84 is connected across electromagnetic coil 31 of contactor 30.

The next time relay contact 54 closes, controlled rectifier 80 will have both gate current and anode voltage, causing it to switch to its conductive state, which seals contactor 30 in through contact 34, readies the add circuit of contactor 40 by closing its contact 32, and arms the anti-drop circuit of contactor 20 by closing its contact 36. Diode 82 prevents continuous current flow through resistor 88.

The add circuit of contractor 40 includes the source potential 14, normally open contact 54 of relay 50, contact 16 of contactor 10, contact 22 of contactor 20, contact 32 of contactor 30, the anode-cathode circuit of controlled rectifier 96, a diode 98, and the electromagnetic coil 41 of contactor 40. The gate electrode g of controlled rectifier 96 is connected to the relay 50 side of contact 32, a resistor 106 is connected from the relay 50 side of contact 32 to bus 7, a resistor 102 is connected from the cathode electrode c of controlled rectifier 96 to bus 7, a protective diode 104 is connected across the cathode-gate electrodes of controlled rectifier 96, and a diode 108 is connected across the electromagnetic coil 41 of contactor 40.

When contact 54 closes to add contactor 30, the gate electrode g of controlled rectifier 96 receives gate current having a duration determined by the value of capacitor 100 and resistor 102, which duration is less than the pickup time of contactor 30. After contact 54 opens, capacitor 100 discharges to bus 7 through resistor 106.

When contact 54 of relay 50 again closes, controlled rectifier 96 has both gate current and anode voltage, causing it to switch to its conductive state, it immediately develops holding current through resistor 102, and contactor 40 is energized. Contactor 40 seals in through its contact 42 and diode 110, and arms the anti-drop circuit of contactor 30 by closing its contact 44. Since contactor 40 is the Nth contactor of the sequence, it does not have to arm the add circuit of another contactor. Diode 98 blocks current from flowing through resistor 102 while contactor 40 is energized through its add-seal circuit.

Figure 2:
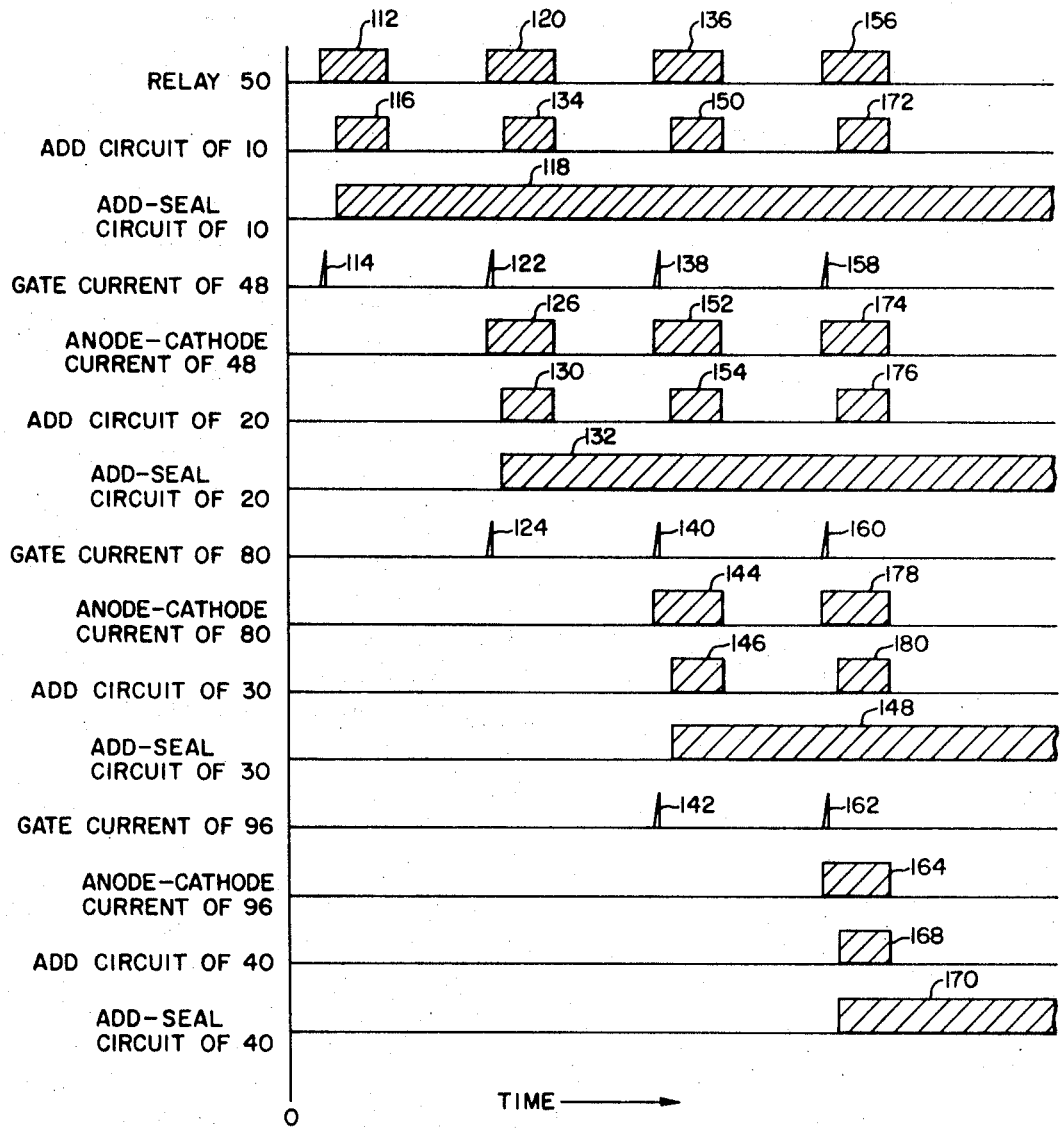
FIGS. 2 and 3 are graphs which aid in the understanding of the schematic diagram of FIG. 1.

The graph shown in FIG. 2 illustrates the closing sequence of contactors 10, 20, 30 and 40, in response to relay 50. When relay 50 is energized as shown at 112, gate current is immediately supplied controlled rectifier 48, as shown at 114, but the gate current terminates before contactor 10 picks up through its add circuit, as shown at 116. When contactor 10 picks up, it is sealed in through its add-seal circuit, as shown at 118. When the external controlled system signals that another contactor should be added in the numbered sequence, relay 50 will again be energized, as shown at 120. Gate current will be immediatey supplied to controlled rectifiers 48 and 80, as shown at 122 and 124. Controlled rectifier 80 does not have anode voltage at this time, so it will not switch to its conductive state. Controlled rectifier 48, however, does have anode voltage, and controlled rectifier 48 will switch to its conductive state, as shown at 126, and will remain conductive until relay 50 is de-energized. When controlled rectifier 48 becomes conductive, contactor 20 will pick up a short time later through its add circuit, as shown at 130, and seal in through its add-seal circuit shown at 132. The add circuit of contactor 10 will also be energized during the energized period 120 of relay 50, as shown at 134.

When it is desirable to add another contactor, relay 50 will be energized at 136, gate current will be supplied to controlled rectifiers 48, 80 and 96 at 138, 140 and 142, respectively, controlled rectifier 80 will be switched to its conductive state, as shown at 144, which picks up contactor 30 through its add circuit shown at 146, and seals in through its add-seal circuit at 148. The add circuit of contactor 10 will be energized, as shown at 150, and controlled rectifier 48 will be switched to its conductive condition for the duration of the energization of relay 50, as shown at 152, which energizes the add circuit of contactor 20, as shown at 154. However, since contactors 10 and 20 are already energized, it has no affect on the operation of the circuit.

When another contactor is to be added in the numerical sequence, relay 50 will be energized, as shown at 156, gate current will be supplied to controlled rectifiers 48, 80 and 96, as shown at 158, 160 and 162, respectively, controlled rectifier 96 will be switched to its conductive state at 164, contactor 40 will be energized through its add circuit at 168, and it will be sealed in through its add-seal circuit at 170. The add circuit of contactor 10 will also be energized, as shown at 172, controlled rectifier 48 will be switched to its conductive condition at 174, which energizes the add circuit of contactor 20 at 176, and controlled rectifier 80 will be switched to its conductive condition at 178, which energizes the add circuit of contactor 30 at 180. However, since contactors 10, 20 and 30 are already energized, it has no affect on the circuit operation.

The add portion of circuit 9 thus automatically closes the first open contactor in the numbered sequence upon receiving a signal from the add relay 50, and the add function for any number of contactors is accomplished with a single auxiliary relay. Further, the add function is accomplished with low cost components, which are lightly loaded. For example, controlled rectifiers 48, 80 and 96 are only in their conductive state during the portion of time that contact 54 of add relay 50 is closed. Accordingly, the controlled rectifiers may be low cost, low current devices, and do not require elaborate heat sinks. Resistors 70, 88 and 102 only carry current during the portion of time that the add circuit of its associated contactor is energized, thus requiring inexpensive, low power resistors. Resistors 72, 92 and 106 are also low power resistors, merely functioning to discharge gate capacitors 68, 86 and 100, and have a high resistance to limit current flow therethrough during the time when relay contacts 54 are closed.

In addition to the requirement that the first open contactor in the numbered sequence be closed upon receiving an appropriate signal, circuit 9 must also provide the function of opening the last closed contactor in the numbered sequence upon receiving an appropriate signal. This function is provided by relay 60, along with its normally closed contact 64 and its normally open contact 66, and an anti-drop circuit associated with all of the contactors, except the Nth contactor. The function of the anti-drop circuits, when armed by the closing of the next higher numbered contactor in the numbered sequence, is to by-pass the normally closed contact 64 of relay 60 when it opens. The by-pass circuit includes the normally open contact 66 of relay 60. Thus, if an anti-drop circuit isn't armed by the closing of the next higher numbered contactor, its associated contactor will drop out when relay 60 is energized.

The anti-drop circuit of contactor 10 includes source potential 14, normally open contact 66 of relay 60, a controlled rectifier 182 having anode, cathode and gate electrodes $a$, $c$ and $g$, respectively, a capacitor 184, resistors 186 and 190, a diode 188, a normally open contact 126 from the next higher numbered contactor in the sequence, and electromagnetic coil 11 of contactor 10. The source potential 14, normally open contact 66, the anode-cathode circuit of controlled rectifier 182, and electromagnetic coil 11 are connected serially, and the gate electrode $g$ of controlled rectifier 182 is connected to the normally open contact 66 of relay 60 through capacitor 184, resistor 186, and normally open contact 126 of contactor 20. Resistor 190 is connected from the junction between resistor 186 and normally open contact 26, to bus 7. Diode 188 is connected across the gate-cathode electrode of controlled rectifier 182.

The anti-drop circuit of contactor 20 includes source potential 14, normally open contact 66 or relay 60, a controlled rectifier 192 having anode, cathode and gate electrodes $a$, $c$ and $g$, respectively, a capacitor 194, a resistor 196, a resistor 200, a diode 198, a normally open contact 36 from the next higher numbered contactor in the sequence, normally open contact 26, and electromagnetic coil 21 of contactor 20. The source potential 14, normally open contact 66, the anode-cathode circuit of controlled rectifier 192, electromagnetic coil 21, and contact 26, are connected serially. The gate electrode $g$ of controlled rectifier 192 is connected to the normally open contact 66 of relay 60 through capacitor 194 and resistor 196, normally open contact 36 of contactor 30, and normally open contact 26 of contractor 20. Resistor 200 is connected from the junction between resistor 196 and normally open contact 36, to bus 7. Diode 198 is connected across the gate-cathode electrode of controlled rectifier 192.

The anti-drop circuit of contactor 30 includes source potential 14, normally open contact 66 of relay 60, a controlled rectifier 202 having anode, cathode and gate electrodes $a$, $c$ and $g$, respectively, a capacitor 204, resistors 206 and 210, a diode 208, normally open contact 26 from contactor 20, normally open contact 36 from contactor 30, normally open contact 44 from contactor 40, and electromagnetic coil 31 of contactor 30. The source potential 14, normally open contact 66, the anode-cathode circuit of controlled rectifier 202, contacts 26 and 36, and electromagnetic coil 31 are all connected in series. The gate electrode $g$ of controlled rectifier 202 is connected to the normally open contact 66 of relay 60 through capacitor 202, resistor 206, and contacts 44, 36 and 26. Resistor 210 is connected from the junction between resistor 206 and contact 44, to bus 7. Diode 208 is connected across the gate-cathode electrodes of controlled rectifier 202.

In describing the operation of the anti-drop circuits of the contactors, assume that all of the contactors 10, 20, 30 and 40 have been closed, which closes all of their normally open contacts, and that it is desirable to open or drop the last closed contactor 40. Relay 60 will be energized, which opens its contact 64 and closes its contact 66. When relay contact 64 opens, the voltage across the electromagnetic coils 11, 21, 31 and 41 drops to substantially zero, due to their inductance and the free-wheeling diodes 38, 58, 84 and 108, respectively. Therefore, the coil current decays exponentially and all contactors remain energized during the transition of contact 66 from its open position to its closed position. Immediately upon contact 66 closing, each of the controlled rectifiers 182, 192 and 202 have both anode voltage and gate current, which switches them to their conductive states, and maintains current flow through the electromagnetic coils 11, 21 and 31. The current flow through electromagnetic coil 41, however, is not maintained, and when it drops below the holding value of contactor 40, contactor 40 will drop out and open its contacts 42 and 44. When relay 60 is de-energized at the end of its predetermined short time interval, current will be maintained in electromagnetic coils 11, 21 and 31 by free-wheeling diodes 38, 58 and 84, during the transition of contact 64 to its closed position, and the current will then be maintained through their respective add-seal circuits, as hereinbefore explained. Diode 94 blocks the current from being maintained in coil 41 through controlled rectifier 202, contact 34, and contact 42. Resistors 190, 200 and 210 discharge capacitors 184, 194 and 204 to bus 7, when relay 60 is de-energized.

When it is desirable to remove another contactor, relay 60 again closes for a predetermined short period of time, controlled rectifiers 182 and 192 will be switched to their conductive conditions to maintain contactors 10 and 20 energized, but controlled rectifier 202 will not receive gate drive current, which allows contactor 30 to drop out, opening its contact 36 which de-arms the anti-drop circuit of contactor 20. Diode 74 blocks current from being maintained in coil 31 via controlled rectifier 192, contact 24, and contact 34. This sequence is continued, as long as contactors are to be removed, with the opening sequence being opposite to the closing sequence.

Figure 3:
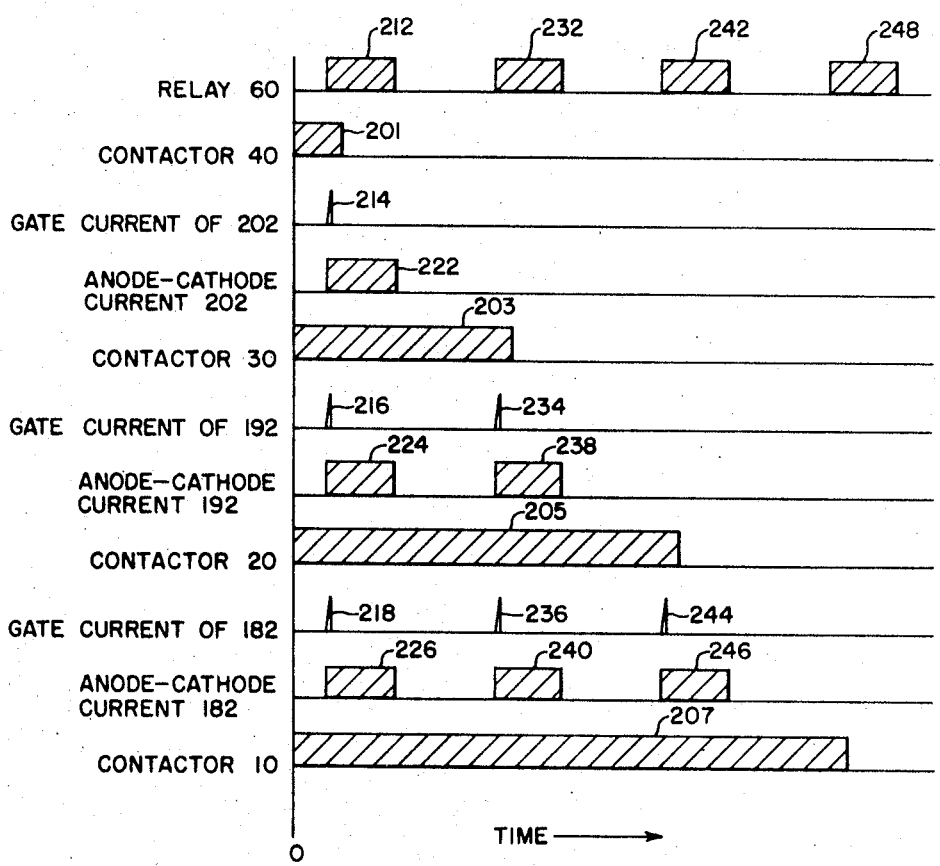

The opening of contactors 10, 20, 30 and 40 is shown graphically in FIG. 3. At time zero, assume that all of the contactors have been closed, as shown at 207, 205, 203 and 201 and, subsequently, relay 60 is energized at 212 for a short interval of time. Gate current is immediately provided to controlled rectifiers 182, 192 and 202 at 218, 216 and 214, respectively, which switches controlled rectifiers 182, 192 and 202 to their conductive states at 226, 224 and 222, respectively, to maintain contactors 10, 20 and 30 energized. Contactor 40, however, drops out a short period of time after relay 60 is energized.

When relay 60 is energized again at 232, gate current is applied to controlled rectifiers 192 and 182 at 234 and 236, respectively, controlled rectifiers 192 and 182 switch to their conductive states at 238 and 240, respectively, maintaining contactors 20 and 10 in their energized conditions, and contactor 30 is allowed to drop out for a short period of time after relay 60 is energized.

When relay 60 is energized again at 242, gate current will be provided controlled rectifier 182 at 244, controlled rectifier 182 will switch to its conductive state at 246, and maintain contactor 10 energized, while contactor 20 is allowed to drop out.

When relay 60 is energized again at 248, contactor 10 will drop out.

Thus, when the remove relay 60 is energized, the last contactor to close in the sequence will be opened. While the closing and opening of the contactors has been described separately, it is not necessary that all of the contactors be closed before any can be opened, or that all must be opened before any can be closed. Circuit 9 will receive open and close signals from relays 50 and 60 in any sequence, and will always close the first open contactor in the numbered sequence upon receiving an add signal, and will always open the last closed contactor in the sequence, upon receiving a remove signal.

The remove function of circuit 9, like the add function, has been accomplished with a single relay, thus requiring only two auxiliary relays to add and remove any number of electrical contactors in a predetermined sequence. Further, the remove function has been accomplished with standard, low cost components, which are lightly loaded. Controlled rectifiers 182, 192 and 202 are only in their conductive states during that short period of time that contact 66 or relay 60 is closed. They may, therefore, be low cost, low current devices, without the necessity of utilizing elaborate heat sink means. Resistors 186, 196, 206, 190, 200 and 210 only carry current during the time a contactor is being removed from the controlled system, and thus they may be inexpensive, low power types.

In summary, there has been disclosed a new and improved electrical circuit 9 for energizing a plurality of electrical contractors in a predetermined sequence, and for deenergizing them in reverse sequence, which requires only two auxiliary relays for any number of contactors. The disclosed circuit arrangement is uncomplicated, it utilizes low power, low cost components, and energizes most of the components only during the time a contactor is being added or removed. Thus, the initial cost of the circuit and its apparatus has been reduced to a minimum, without impairing its ability to function, its reliability is excellent due to the light duty cycle and loads on its components, and its uncomplicated structure, which is substantially the same for each contactor in the sequence, facilitates any maintenance required.

Since numerous changes may be made in the above-described apparatus and different embodiments of the invention may be made without departing from the spirit thereof, it is intended that all matter contained in the foregoing description or shown in the accompanying drawings, shall be interpreted as illustrative and not in a limiting sense.

I claim as my invention:

1. An electrical circuit for energizing and deenergizing a plurality of electrical contactors in a predetermined sequence, comprising:
   a source of direct current potential,
   a plurality of contactors numbered 1 . . . N, each having an electromagnetic coil and a plurality of normally open contacts,
   first relay means having a normally open contact,
   means energizing said first relay means for a predetermined period of time each time a contactor is to be energized,
   second relay means having a normally open contact and a normally closed contact,
   means energizing said second relay means for a predetermined period of time each time a contactor is to be deenergized,
   a plurality of static switching devices each having main electrodes and a control electrode,
   said plurality of contactors each having an add circuit which includes said source of direct current potential and the normally open contact of said first relay means, the add circuits of the contactors numbered 2 . . . N also including a static switching device and a normally open contact from each of the lower numbered contactors,
   said plurality of contactors each having an add-seal circuit which includes said source of direct current potential, the normally closed contact of said second relay means, and one of its own normally open contacts, said plurality of switches numbered 1 . . . N−1 each having an anti-drop circuit which includes said source of direct current potential, the normally open contact of said second relay means, a static switching device, a normally open contact of the next higher numbered contactor, and a normally open contact from the lower numbered contactors starting with the second contactor,
   each contactor energized by its add circuit in response to said first relay means closes its normally open contacts to seal in through its associated add-seal circuit, arms the add circuit of the next higher numbered contactor, and arms the anti-drop circuit of the next lower numbered contactor,
   each contactor de-energized in response to said second relay means opens its normally open contacts and de-arms the anti-drop circuit of the next lower numbered contactor.

2. The electrical circuit of claim 1 wherein the add circuits are series circuits, with certain of the normally open contacts from the contactors being connected in their numbered order starting at the normally open contact of said first relay means.

3. The electrical circuit of claim 2 wherein the static switches associated with the 2 . . . N numbered contactors each have their control electrode connected to the first relay means side of the normally open contact from the immediately preceding lower numbered contactor, and one of its main electrodes connected to the remaining side of said contact.

4. The electrical circuit of claim 1 wherein the anti-drop circuits are series circuits, with the normally open contacts from the contactors being connected in their numbered order starting at the normally open contact of said second relay means.

5. The electrical circuit of claim 4 wherein the static switches associated with the 1 . . . N−1 numbered contactors each have one of their main electrodes connected to the second relay means side of the normally open contact of the next higher numbered contactor, and its control electrode connected to the remaining side of said contact.

6. The electrical circuit of claim 1 wherein the add circuits are series circuits, with certain of the normally open contacts from the contactors being connected in their numbered order starting at the normally open contact of said first relay means, and wherein the anti-drop circuits are series circuits, with certain of the normally open contacts from the contactors being connected in their numbered order starting at the normally open contact of said second relay means.

7. The electrical circuit of claim 6 wherein the static switches in the add circuits of the 2 ... N numbered contactors each have their control electrode connected to the first relay means side of the normally open contact from the immediately preceding lower numbered contactor, and one of its main electrodes connected to the remaining side of said contact, and wherein the static switches associated with the anti-drop circuits of the 1 ... N−1 numbered contactors have one of their main electrodes connected to the second relay means side of the normally open contact of the next higher numbered contactor, and its control electrode connected to the remaining side of said contact.

References Cited

UNITED STATES PATENTS 3,076,918   2/1963   Hinkle et al. _____ 317—140

LEE T. HIX, Primary Examiner

U.S. Cl. X.R.

317—148.5, 154